(12) United States Patent
Lin et al.

(10) Patent No.: US 11,391,989 B2
(45) Date of Patent: Jul. 19, 2022

(54) LIGHT EMITTING APPARATUS, AND METHOD OF ADJUSTING EMISSION SPECTRUM THEREOF, BACKLIGHT MODULE AND LIQUID CRYSTAL DISPLAY APPARATUS

(71) Applicants: BEIJING BOE OPTOELECTRONICS TECHNOLOGY CO., LTD., Beijing (CN); BOE TECHNOLOGY GROUP CO., LTD, Beijing (CN)

(72) Inventors: Donglong Lin, Beijing (CN); Peng Wu, Beijing (CN); Zeyuan Tong, Beijing (CN); Fujian Ren, Beijing (CN); Wenyang Li, Beijing (CN); Bin Long, Beijing (CN); Zhipeng Zhang, Beijing (CN); Dong Cui, Beijing (CN); Rui Han, Beijing (CN); Qing Ma, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 714 days.

(21) Appl. No.: 16/329,899

(22) PCT Filed: Jul. 18, 2018

(86) PCT No.: PCT/CN2018/096167
§ 371 (c)(1),
(2) Date: Mar. 1, 2019

(87) PCT Pub. No.: WO2019/062290
PCT Pub. Date: Apr. 4, 2019

(65) Prior Publication Data
US 2021/0356815 A1    Nov. 18, 2021

(30) Foreign Application Priority Data

Sep. 28, 2017 (CN) .......................... 201710899172.0

(51) Int. Cl.
G02F 1/13357    (2006.01)
G02F 1/1335     (2006.01)

(52) U.S. Cl.
CPC .. *G02F 1/133609* (2013.01); *G02F 1/133514* (2013.01)

(58) Field of Classification Search
CPC ......... G02F 1/133615; G02F 1/133514; G02F 1/133609
See application file for complete search history.

(56) References Cited

U.S. PATENT DOCUMENTS

| 2007/0002218 A1* | 1/2007 | Park .................. G02F 1/133514 349/106 |
| 2017/0103715 A1* | 4/2017 | Oyama .................... G09G 3/36 |
| 2017/0186922 A1  | 6/2017 | Kim et al. |

FOREIGN PATENT DOCUMENTS

| CN | 101013224 A | 8/2007 |
| CN | 101017279 A | 8/2007 |

(Continued)

OTHER PUBLICATIONS

International Search Report and Written Opinion dated Oct. 16, 2018 from State Intellectual Property Office of the P.R. China.

*Primary Examiner* — Mariceli Santiago
(74) *Attorney, Agent, or Firm* — Dilworth & Barrese, LLP.; Michael J. Musella, Esq.

(57) ABSTRACT

A light emitting apparatus, a method of adjusting a light emission spectrum thereof, a backlight module and a liquid crystal display apparatus. The light emitting apparatus includes a light source and a color filter layer on a light exiting side of the light source. The color filter layer includes
(Continued)

color filters of at least two colors arranged in an array, and the color filter layer is configured to have different transmissions to light of the at least two colors in white light emitted from the light source.

17 Claims, 3 Drawing Sheets

(56) References Cited

FOREIGN PATENT DOCUMENTS

| | | | | | |
|---|---|---|---|---|---|
| CN | 102916138 | A | | 2/2013 | |
| CN | 105425452 | A | | 3/2016 | |
| CN | 105467674 | A | | 4/2016 | |
| CN | 106896569 | A | | 6/2017 | |
| CN | 107505760 | A | * | 12/2017 | |
| CN | 107505774 | A | | 12/2017 | |
| CN | 107505760 | B | * | 6/2020 | ....... G02F 1/133512 |
| JP | 2017076006 | A | * | 4/2017 | ....... G02F 1/133504 |
| KR | 20070096158 | A | * | 10/2007 | |
| WO | WO-2013069601 | A1 | * | 5/2013 | ....... G02F 1/133615 |

* cited by examiner

LIGHT EMITTING APPARATUS, AND METHOD OF ADJUSTING EMISSION SPECTRUM THEREOF, BACKLIGHT MODULE AND LIQUID CRYSTAL DISPLAY APPARATUS

The application claims priority of the Chinese patent application No. 201710899172.0, filed on Sep. 28, 2017, the entire disclosure of which is incorporated herein by reference as part of the present application.

TECHNICAL FIELD

At least one embodiment of the disclosure relates to a light emitting apparatus and a method of adjusting light emission spectrum thereof, a backlight module, and a liquid crystal display apparatus.

BACKGROUND

With the development of science and technology, people's pursuit to color is increasing day by day, and products with high color gamut gradually occupy the dominant position in the market, and restoring natural colors has also become a development direction of the modern display technology. The color gamut refers to a range consisting of a number of colors which an apparatus can express, that is, a color range which can be expressed by various screen display devices, printers, or printing devices. The National Television Standards Committee (NTSC) developed the NTSC color gamut standard based on the CIE chromaticity diagram, which delineates a 100% color gamut region, and quantifies the size of the color gamut by percentage. Generally, the color gamut with a color gamut value of about 72% NTSC is a normal color gamut, and the color gamut with a color gamut value of 90% or more is called a high color gamut.

SUMMARY

At least one embodiment of the disclosure provides a light emitting apparatus, a method of adjusting a light emission spectrum thereof, a backlight module and a liquid crystal display apparatus.

At least one embodiment of the disclosure provides a light emitting apparatus comprising: a light source and a color filter layer on a light exiting side of the light source. The color filter layer comprises color filters of at least two colors arranged in an array, and the color filter layer is configured to have different transmittances to light of the at least two colors in white light emitted by the light source.

For example, the light source emits first white light, the first white light is converted to second white light after passing through the color filter layer, and the first white light comprises first color light and second color light, a relative spectral intensity of the first color light in the first white light is smaller than a relative spectral intensity of the second color light in the first white light, the color filter layer is configured to have a transmittance to the first color light larger than that to the second color light, so that a relative spectral intensity of the first color light in the second white light is larger than a relative spectral intensity of the second color light in the second white light.

For example, the light source comprises yttrium aluminum garnet (YAG) fluorescent powder.

For example, the first color light has a wavelength larger than that of the second color light.

For example, the first color light is red light and the second color light is green light or blue light.

For example, the color filters of the at least two colors have different volumes, so that the color filter layer has different transmittances to the light of the at least two colors emitted from the light source.

For example, the color filters of the at least two colors have different areas to adjust the transmittances of the color filter layer to the light of the at least two colors.

For example, the color filters of the at least two color filters have different thicknesses to adjust the transmittances of the color filter layer to the light of the at least two colors.

For example, the color filter layer comprises a red color filter, a green color filter, and a blue color filter.

For example, the color filter layer further comprises a transparent film layer or an opening.

For example, the color filter of each color comprises a plurality of color filters each having the same shape and size.

For example, the plurality of the color filters of each color are evenly distributed.

At least one embodiment of the disclosure provides a method of adjusting a light emission spectrum of any one of the above light emitting apparatuses comprising: acquiring an original spectrum of light emitted by the light source; acquiring a reference spectrum; comparing the original spectrum with the reference spectrum to obtain a comparison result; adjusting the color filter layer according to the comparison result so that the original spectrum of the light source is converted to a target spectrum after the light emitted by the light source passes through the color filter layer, and the target spectrum is substantially the same as the reference spectrum.

For example, adjusting the color filter layer comprises adjusting volumes of the color filters of the at least two colors.

For example, adjusting the volumes of the color filters of the at least two colors comprised in the color filter layer comprises: adjusting areas of the color filters of the at least two colors.

For example, adjusting the volumes of the color filters of the at least two colors comprised in the color filter layer comprises: adjusting thicknesses of the color filters of the at least two colors.

At least one embodiment of the disclosure provides a backlight module comprising the light emitting apparatus according to any one of the above embodiments; and a light adjustment structure on a light exiting side of the light emitting apparatus to achieve uniform light extraction.

At least one embodiment of the disclosure provides a liquid crystal display apparatus, comprising an array substrate and a color filter substrate disposed oppositely, a liquid crystal layer between the array substrate and the color filter substrate, and the backlight module according to any one of the above embodiments on a side of the array substrate far away from the liquid crystal layer.

BRIEF DESCRIPTION OF THE DRAWINGS

In order to clearly illustrate the technical solution of the embodiments of the disclosure, the drawings of the embodiments will be briefly described in the following. It is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. The terms "comprise," or "comprise," etc. are intended to specify that the elements or the objects stated before these terms encompass the elements or the objects and equivalents thereof listed after these terms, but do not preclude the other elements or objects. "On," "under," and the like are only used to indicate relative position relationship.

In the study, the inventors of the application found that a relatively effective method of improving the color gamut is to improve the backlight, that is, the purpose of improving the color gamut of the display apparatus to which the backlight is applied can be achieved by improving the purity of the backlight (especially the three wavelength bands of red, green and blue).

Embodiments of the disclosure provide a light emitting apparatus, a method of adjusting a light emission spectrum thereof, a backlight module, and a liquid crystal display apparatus. The light emitting apparatus comprises a light source and a color filter layer provided on a light exiting side of the light source. The color filter layer comprises color filters of at least two colors arranged in an array, and the color filter layer is configured to have different transmittances to light of the at least two colors from the white light emitted from the light source. The light emission spectrum of the light emitting apparatus is adjusted, and in turn the color gamut of the display apparatus including the light emitting apparatus is improved.

The light emitting apparatus, the method of adjusting the light emission spectrum thereof, the backlight module and the liquid crystal display apparatus according to the embodiments of the disclosure will be described below with reference to the accompanying drawings.

Figure 1A:
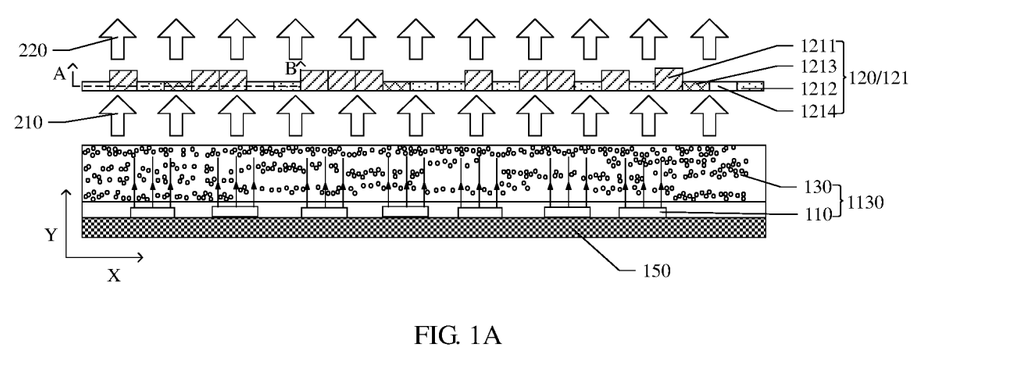
FIG. 1A is a partial structural schematic diagram of a light emitting apparatus according to an embodiment of the disclosure.

FIG. 1A is a partial structural schematic diagram of a light emitting apparatus according to an embodiment of the disclosure. As shown in FIG. 1A, the light emitting apparatus comprises a light source 1130 and a color filter layer 120 provided on a light exiting side of the light source 1130. The color filter layer 120 comprises color filters 121 of at least two colors arranged in a two-dimensional array, and the color filter layer 120 is configured to have different transmittances to light of the at least two colors in white light emitted from the light source 1130. The light emitting apparatus of the embodiment of the disclosure adjusts the transmittance to the light of the at least two colors emitted from the light source by the color filter layer, that is, the color filter layer can adjust the transmittance to the light with a specific wavelength of the light emitted from the light source, so that the original spectrum of the light emitting apparatus is converted to the target spectrum, thereby improving the color gamut of the display apparatus to which the light emitting apparatus is applied.

For example, the light source 1130 of the embodiment comprises a light emitting chip 110 and fluorescent powder 130 provided on the light exiting side of the light emitting chip 110.

For example, the light emitting chip 110 can be a light emitting diode chip, and the embodiment comprises but is not limited to this. For example, the light emitted by the light emitting chip 110 is blue light, the fluorescent powder 130 is YAG (yttrium aluminum garnet) fluorescent powder, the blue light emitted by the light emitting chip 110 excites the YAG fluorescent powder to form the first white light 210, and the embodiment comprises but is not limited to this.

For example, the light emitted by the light emitting chip 110 is blue light, the fluorescent powder 130 is RG fluorescent powder, and the blue light emitted by the light emitting chip 110 excites the RG fluorescent powder 130 to form the first white light 210. The embodiment is not limited to this, provided that the light source 1130 can emit the first white light 210.

For example, as shown in FIG. 1A, the color filters 121 of the at least two colors comprised in the color filter layer 120 comprise a red color filter 1211, a green color filter 1212, and a blue color filter 1213.

For example, the color filter 121 of each color transmits the light of the same color and absorbs most of the light of other colors.

For example, the red color filter 1211 can transmit red light (700 nm) and a small amount of the light of other colors of the first white light 210, with the transmittance of the red light being much larger than that of the other colors; the green color filter 1212 can transmit the green light (546.1 nm) and a small amount of the light of other colors of the first white light 210, with the transmittance of the green light being much larger than that of the other colors; the blue color filter 1213 can transmit the blue light (435.8 nm) and a small amount of the light of other colors of the first white light 210, with the transmittance of blue light being much larger than that of the other colors, and therefore, the light transmitted by the different color filters 121 is mixed to form the second white light 220.

The embodiment is not limited to this, and the color filters of the at least two colors comprised in the color filter layer can also be a red color filter and a blue color filter. In this case, an opening is required to provide in the color filter layer, so that a part of the first white light is transmitted, that is, when the color filter layer comprises color filters of two colors, the color filter layer further comprises an opening.

For example, as shown in FIG. 1A, the color filter layer 120 further comprises a transparent film layer 1214 or an opening 1214, and the transparent film layer transmits almost all of the light of the first white light 210 or the opening transmits almost all of the light of the first white light 210. Therefore, the light transmittance of the color filter layer can be improved by using a transparent film layer or opening.

For example, the embodiment describes an example in which the volumes of the color filters 121 of at least two colors are different so that the transmittances of the color filter layer 120 to the light of at least two colors of the light emitted from the light source 1130 are different. However, the embodiment is not limited to this. For example, it is also possible that the volumes of the color filters of all colors are the same, but doping a certain material (for example, a light conversion material, a shading material or the like) to the color filter of one or several colors changes the transmittance of the color filter doped with the material to the light of the at least two colors, so that the transmittances of the color filter layer to the light of at least two colors of the light emitted from the light source are different.

For example, as shown in FIG. 1A, the first white light 210 passes through the color filter layer 120 and is converted to the second white light 220. The relative spectral intensity of each color light in the second white light 220 can be adjusted by adjusting the volume of the color filter 121 of each color of the color filter layer 120, so that the original spectrum of the light emitting apparatus is converted to the target spectrum, thereby improving the color gamut of the display apparatus to which the light emitting apparatus is applied.

Figure 1B:
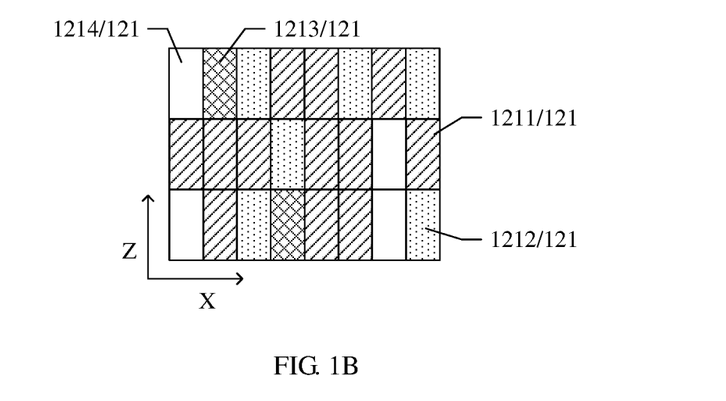
FIG. 1B is a partial plan schematic diagram of the light emitting apparatus shown in FIG. 1A along line AB.

For example, FIG. 1B is a partial plan schematic diagram of the light emitting apparatus shown in FIG. 1A along line AB. As shown in FIG. 1B, the color filter layer 120 comprises color filters 121 of at least two colors arranged in a two-dimensional array, that is, the color filters 121 comprised in the color filter layer 120 are arranged in an array in the X direction and the Y direction. The difference in volumes of the color filters 121 of the at least two colors comprised in the color filter layer 120 comprises: only adjusting the areas of the color filters 121 of the at least two colors, that is, only adjusting the areas of the color filters 121 of the at least two colors in the XZ plane, so that the volumes of the color filters 121 of the at least two colors are different, and thus the transmittances of the color filter layer 120 to the at least two colors of light are different.

For example, as shown in FIG. 1B, the color filter 121 of each color comprises a plurality of color filters 121, that is, a number of color filters 121 of each color is more than one, and each color filter 121 has the same shape and size, that is, the color filters 121 of all colors comprised in the color filter layer 120 have the same shape and size in the XZ plane. Therefore, in an example of the embodiment, the area ratio of the color filters of different colors of the color filter layer can be converted to the number ratio of the color filters of the different colors, so that the original spectrum of the light emitting apparatus is adjusted more conveniently.

For example, the shape of each of the color filters 121 can be a rectangle as shown in FIG. 1B, or can be a circular shape, a polygonal shape, or other irregular shapes, which is not limited in the embodiment.

For example, multiple color filters 121 of each color are evenly distributed.

For example, the color filters 121 of different colors can be alternately arranged, that is, the red color filter 1211, the green color filter 1212, and the blue color filter 1213 are evenly distributed, so that the light emitted from the color filter layer is more uniform.

For example, as shown in FIG. 1A, the difference in volumes of the color filters 121 of the at least two colors comprised in the color filter layer 120 further comprises: the difference in the thickness of the color filters 121 of the at least two colors, to adjust transmittances of the color filter layer 120 to the light of the at least two colors, that is, the adjustment of the transmittances of the light of the at least two colors is achieved by adjusting the thickness of the color filter 121 of the at least two colors in the Y direction.

For example, in the embodiment, the transmittance of the red color filter to the light of other colors can be changed by adjusting the thickness of the red color filter. For example, the thickness of the red color filter can be increased to reduce its transmittance to blue and green light.

For example, as shown in FIGS. 1A and 1B, the adjustment of both of the areas and the thicknesses of the color filters 121 of the at least two colors comprised in the color filter layer 120 can be performed to better achieve the adjustment of the volumes of the color filters 121.

For example, when the thicknesses of the color filters of different colors of the color filter layer are different, the color filter layer may have an uneven side, that is, a certain portion can generate a depressed portion, and after the filter layer is formed, a planarization layer can be formed on the uneven side of the color layer to enable the planarization layer to fill the depressed portion of the color filter layer, thereby planarizing the color filter layer.

Figure 2A:
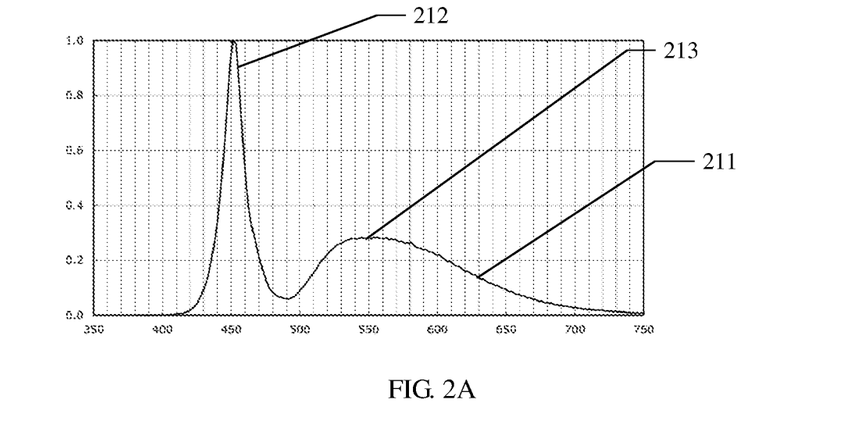
FIG. 2A is an original spectrum diagram of a light emitting apparatus according to an embodiment of the disclosure.
Figure 2B:
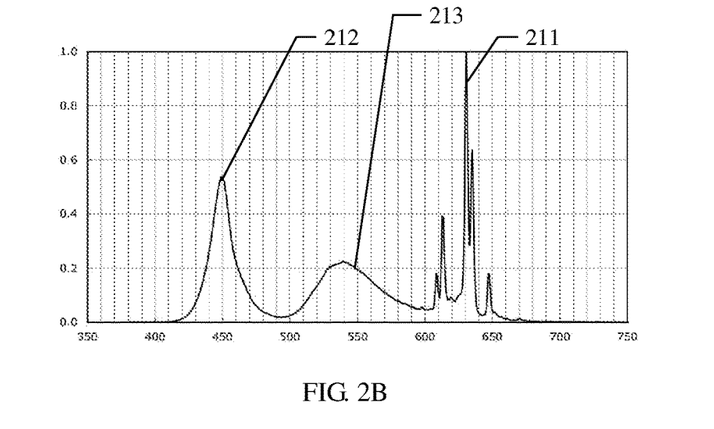
FIG. 2B is a reference spectrum diagram of a light emitting apparatus according to an embodiment of the disclosure.

For example, FIG. 2A is an original spectrum diagram of a light emitting apparatus according to an embodiment of the disclosure, and FIG. 2B is a reference spectrum diagram of a light emitting apparatus according to an embodiment of the disclosure. As shown in FIGS. 2A and 2B, the horizontal ordinates of the figures are the wavelength of the light, and the vertical ordinates of the figures are the relative spectral intensity of the light at each wavelength. In this embodiment, the spectrum of the first white light emitted by the light source is the original spectrum, and the first white light is converted to the second white light by passing through the color filter layer, and the spectrum of the second white light is the target spectrum. In the embodiment, the spectral difference between the reference spectrum and the original spectrum is used as a design basis of the color filter layer, and the volume of the color filter of each color of the color filter layer is adjusted so that the target spectrum of the second white light is substantially the same as the reference spectrum. That is, the target spectrum of the second white light of the embodiment and the reference spectrum shown in FIG. 2B are similar (for example, the similarity of the target spectrum to the reference spectrum is 90% or more) or identical.

For example, as shown in FIG. 2A, the original spectrum of the embodiment is a spectrum of a light source comprising YAG fluorescent powder, and when the spectrum is applied to a display apparatus, the display apparatus has a low color gamut.

For example, as shown in FIG. 2A, the first white light of the original spectrum comprises first color light 211 and second color light 212, with the relative spectral intensity of the first color light 211 being smaller than the relative spectral intensity of the second color light 212.

For example, the wavelength of the first color light 211 is larger than the wavelength of the second color light 212.

For example, the first color light 211 is red light and the second color light 212 is green light or blue light.

For example, as shown in FIG. 2A, a center wavelength of the first color light 211 is 630 nm, and a center wavelength of the second color light 212 is 450 nm, that is, the first color light 211 is red light, and the second color light 212 is blue light.

For example, as shown in FIG. 2A, the original spectrum further comprises a third color light 213 having a center wavelength of 550 nm, that is, the third color light 213 is green light.

For example, as shown in FIG. 2A, the relative spectral intensity of the second color light 212 is the largest, and the relative spectral intensities of the first color light 211 and the third color light 213 are smaller than the relative spectral intensity of the second color light 212.

For example, the relative spectral intensity of the first color light 211 is about 0.1, the relative spectral intensity of the second color light 212 is about 1, and the relative spectral intensity of the third color light 213 is about 0.3.

For example, as shown in FIG. 2B, the reference spectrum of the embodiment is a spectrum of a light source comprising RG fluorescent powder, and when the spectrum is applied to a display apparatus, the color gamut of the display apparatus is higher than the color gamut of a display apparatus having the original spectrum as shown in FIG. 2A. Therefore, in the embodiment, a color filter layer can be provided on a light exiting side of the light source comprising the YAG fluorescent powder, so that the first white light emitted from the light source comprising the YAG fluorescent powder is converted to the second white light by passing through the color filter layer, and the second white light has a similar spectrum to a spectrum of a light source comprising the RG fluorescent powder.

For example, as shown in FIG. 2B, the relative spectral intensity of the first color light 211 comprised in the reference spectrum is the largest, and the relative spectral intensities of the second color light 212 and the third color light 213 are smaller than the relative spectral intensity of the first color light 211.

For example, the relative spectral intensity of the first color light 211 is about 1, the relative spectral intensity of the second color light 212 is about 0.5, and the relative spectral intensity of the third color light 213 is about 0.2.

For example, as shown in FIGS. 2A and 2B, comparing the original spectrum with the reference spectrum, the differences between the two spectra are that the relative spectral intensity of the first color light 211 having a wavelength band between 600 nm and 650 nm is increased, and the peak wavelength of the entire spectrum is changed from 450 nm to 630 nm, the relative spectral intensity of the first color light 211 is increased by 10 times, the relative spectral intensity of the second color light 212 is attenuated by ½, and the relative spectral intensity of the third color light 213 is attenuated by ⅓.

Therefore, the color filter layer of the embodiment is configured to increase the relative spectral intensity of the first color light 211 by 10 times, the relative spectral intensity of the second color light 212 is attenuated by ½, and the relative spectral intensity of the third color light 213 is attenuated by ⅓, so that the relative spectral intensity of the first color light 211 is larger than the relative spectral intensities of the second color light 212 and the third color light 213, that is, the color filter layer is configured to have transmittance to the first color light 211 larger than the transmittance to the second color light 212 and the transmittance to the third color light 213, so that the relative spectral intensity of the first color light 211 in the second white light is larger than the relative spectral intensity of the first color light 211 in the first white light.

It can be seen from the above comparison results that if the relative spectral intensity of the band of 600 nm to 650 nm is improved, it is necessary to maximize the proportion of the volume of the red color filter in the total volume of the color filter. Comparing the three primary color change ratios, in the case where the thickness of each color filter is the same, the area ratio of the three color filters is R:G:B=40:2:1. Considering that the ratio is difficult to achieve on the light emission surface of the small-area light emitting diode, the adjustment of the color filter ratio can be achieved by adjusting the thickness of the three color filters.

For example, if the thickness of the blue color filter and the green color filter is constant, and the thickness of the red color filter layer is changed to 4 times larger than the thickness of the blue color filter and the green color filter, the area ratio of the color filter of each color can be changed to R:G:B=10:2:1. In this case, the color filters are relatively easy to arrange on the surface of the light emitting diode. After the above adjustment of the color filter layer is performed, the target spectrum of the second white light obtained by the first white light passing the color filter layer is substantially the same as the reference spectrum.

The embodiment only illustrates an example in which the spectrum of the light source comprising the YAG fluorescent powder is the original spectrum, and the spectrum of the light source comprising the RG fluorescent powder is the reference spectrum, but it is not limited to this.

In the embodiment of the disclosure, a color filter layer is provided in the light emitting apparatus, and the light emission spectrum of the light emitting apparatus is improved by adjusting the volume of the color filter of the color filter layer, and the embodiment of the disclosure can achieve fine-adjusting the white coordinate of the display apparatus without adjusting lumps of color.

Figure 3:
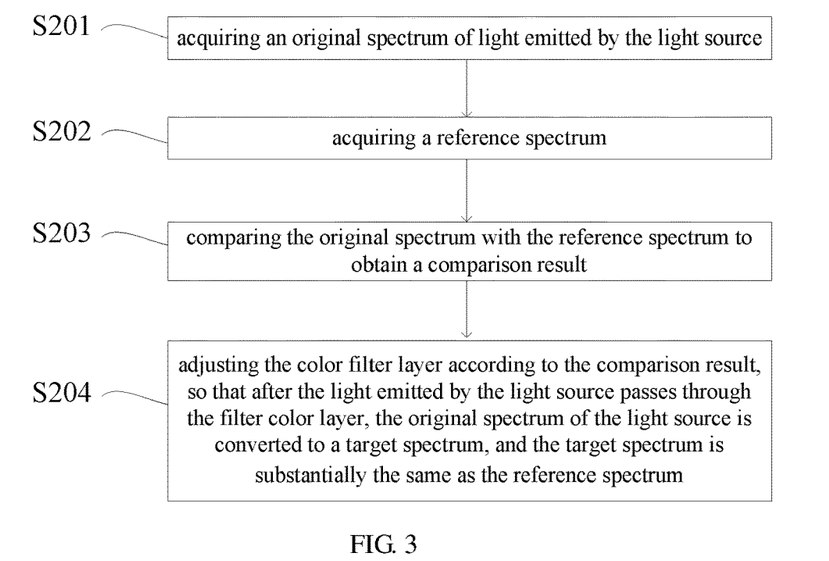
FIG. 3 is a schematic flow chart of a method of adjusting a light emission spectrum of a light emitting apparatus according to an embodiment of the disclosure.

FIG. 3 is a schematic flowchart of a method of adjusting a light emission spectrum of a light emitting apparatus according to an embodiment of the disclosure. As shown in FIG. 3, the method of adjusting an light emission spectrum of the light emitting apparatus shown in FIG. 1A according to the embodiment comprises:

S201: acquiring an original spectrum of light emitted by the light source.

For example, in the embodiment, acquiring the original spectrum of the light emitted by the light source comprises acquiring a spectrum of a light source comprising YAG fluorescent powder as shown in FIG. 2A. When the spectrum is applied to a display apparatus, the display apparatus has a low color gamut. The original spectrum herein refers to the spectrum of the first white light emitted by the light source which has not passed through the color filter layer.

For example, the original spectrum is the spectrum of the first white light emitted by the light source, and the original spectrum comprises the first color light and the second color light, with the relative spectral intensity of the first color light being smaller than the relative spectral intensity of the second color light.

For example, as shown in FIG. 2A, the center wavelength of the first color light 211 is 630 nm, and the center wavelength of the second color light 212 is 450 nm, that is, the first color light 211 is red light, and the second color light 212 is blue light.

For example, as shown in FIG. 2A, the original spectrum further comprises a third color light 213 having the center wavelength of 550 nm, that is, the third color light 213 is green light.

For example, as shown in FIG. 2A, the relative spectral intensity of the second color light 212 is the largest, and the relative spectral intensities of the first color light 211 and the third color light 213 are smaller than the relative spectral intensity of the second color light 212.

For example, the relative spectral intensity of the first color light 211 is about 0.1, the relative spectral intensity of the second color light 212 is about 1, and the relative spectral intensity of the third color light 213 is about 0.3.

S202: acquiring a reference spectrum.

For example, in the embodiment, acquiring the reference spectrum comprises acquiring a spectrum of a light source comprising the RG fluorescent powder as shown in FIG. 2B.

For example, as shown in FIG. 2B, the relative spectral intensity of the first color light 211 comprised in the reference spectrum is the largest, and the relative spectral intensities of the second color light 212 and the third color light 213 are smaller than the relative spectral intensity of the first color light 211.

For example, the relative spectral intensity of the first color light 211 is about 1, the relative spectral intensity of the second color light 212 is about 0.5, and the relative spectral intensity of the third color light 213 is about 0.2.

S203: comparing the original spectrum with the reference spectrum to obtain a comparison result.

For example, as shown in FIGS. 2A and 2B, comparing the original spectrum with the reference spectrum, the differences between the two spectra are that the relative spectral intensity of the first color light 211 having a wavelength band between 600 nm and 650 nm is increased, and the peak wavelength of the entire spectrum is changed from 450 nm to 630 nm, the relative spectral intensity of the first color light 211 is increased by 10 times, the relative spectral intensity of the second color light 212 is attenuated by ½, and the relative spectral intensity of the third color light 213 is attenuated by ⅓.

S204: adjusting the color filter layer according to the comparison result, so that after the light emitted by the light source passes through the filter color layer, the original spectrum of the light source is converted to a target spectrum, and the target spectrum is substantially the same as the reference spectrum.

For example, the first white light emitted by the light source is converted to the second white light after passing the color filter layer and the original spectrum of the first white light is converted to the target spectrum of the second white light by adjusting the volumes of the color filters of the at least two colors comprised in the color filter layer. Here, "the target spectrum is substantially the same as the reference spectrum" refers to that the target spectrum of the embodiment and the reference spectrum shown in FIG. 2B are similar (for example, the similarity of the target spectrum to the reference spectrum is 90% or more) or identical.

For example, the volumes of the color filters of the at least two colors comprised in the color filter layer is adjusted to increase the relative spectral intensity of the first color light 211 by 10 times and attenuate the relative spectral intensity of the second color light 212 by ½, and the relative spectral intensity of the third color light 213 is attenuated by ⅓, that is, the color filter layer is configured to have the transmittance to the first color light 211 larger than the transmittance to the second color light 212 and the transmittance to the third color light 213, so that the relative spectral intensity of the first color light 211 in the second white light is larger than the relative spectral intensity of the first color light 211 in the first white light.

For example, the color filters of the at least two color filters comprised in the color filter layer comprises a red color filter, a green color filter, and a blue color filter.

For example, a color filter of each color transmits light of the same color and absorbs light of other colors. Therefore, the red color filter transmits the red light (700 nm) of the white light, the green color filter transmits the green light (546.1 nm) of the white light and the blue color filter transmits the blue light (435.8 nm) of the first white light, and therefore, the light transmitted by the different color filters is mixed to form the second white light.

For example, the color filter layer further comprises a transparent film layer or an opening, the transparent film layer transmits almost the light of all colors of the first white light, or the opening transmits the light of all colors of the first white light. Therefore, the light transmittance of the color filter layer can be improved by using the transparent film layer or opening.

For example, adjusting the volumes of the color filters of the at least two colors comprised in the color filter layer comprises: adjusting an area of the color filter of the at least two colors.

For example, a color filter of each color comprises a plurality of color filters each having the same shape and size. Therefore, in an example of the embodiment, the area ratio of the color filters of different colors of the color filter layer can be converted to the number ratio of the color filters of the different colors, so that the original spectrum of the light emitting apparatus is adjusted more conveniently.

For example, adjusting the volumes of the color filters of the at least two colors comprised in the color filter layer comprises adjusting thicknesses of the color filters of the at least two colors.

For example, the adjustment of both of the areas and the thicknesses of the color filters of the at least two colors comprised in the color filter layer can be performed to better achieve the adjustment of the volume of the color filter.

For example, it can be seen from the above comparison results that if the relative spectral intensity of the band of 600 nm to 650 nm is improved, it is necessary to maximize the proportion of the volume of the red color filter in the total volume of the color filter. Comparing the three primary color change ratios, in the case where the thickness of each color filter is the same, the area ratio of the three color filters is R:G:B=40:2:1. Considering that the ratio is difficult to be achieved on the light emission surface of the small-area light emitting diode, the adjustment of the color filter ratio can be achieved by adjusting the thickness of the three color filters. For example, if the thickness of the blue color filter and the green color filter is constant, and the thickness of the red color filter layer is changed to 4 times larger than the thickness of the blue color filter and the green color filter, the area ratio of the color filters of each color can be changed to R:G:B=10:2:1. In this case, the color filter is relatively easy to arrange on the surface of the light emitting diode. After the above adjustment of the color filter layer is performed, the target spectrum of the second white light obtained by the first white light passing through the color filter layer is substantially the same as the reference spectrum.

The embodiment only illustrates an example in which the spectrum of the light source comprising the YAG fluorescent powder is the original spectrum, and the spectrum of the light source comprising the RG fluorescent powder is the reference spectrum, but it is not limited to this.

Figure 4:
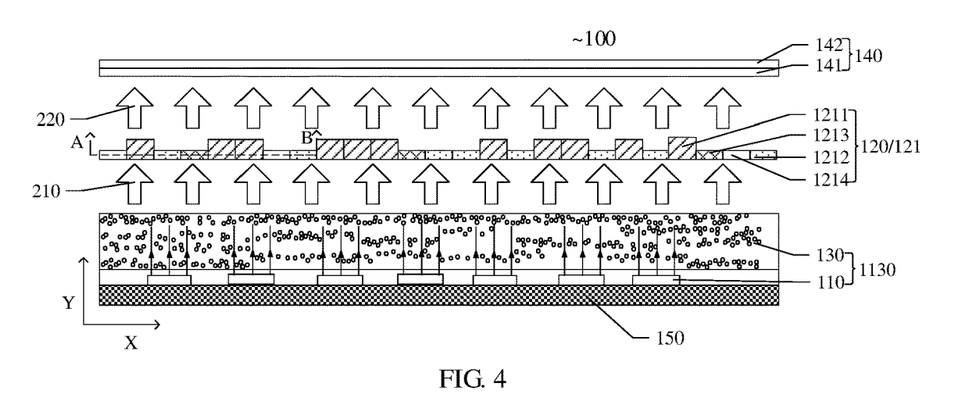
FIG. 4 is a partial structural schematic diagram of a backlight module according to an embodiment of the disclosure.

FIG. 4 is a partial structural schematic diagram of a backlight module according to an embodiment of the disclosure. As shown in FIG. 4, the backlight module 100 according to the embodiment comprises the light emitting apparatus according to any of the above embodiments, and a light adjustment structure 140 provided on a light exiting side of the light emitting apparatus for achieving uniform light extraction for the second white light 220.

For example, as shown in FIG. 4, the embodiment illustrates an example in which the backlight module 100 is a direct-type backlight module, and the light adjustment structure 140 comprises a diffusion film 141.

For example, the diffusion film 141 can comprise a polymer (such as polycarbonate, polymethyl methacrylate, polyethylene terephthalate, etc.) substrate having high transmittance and scattering particles (such as titanium dioxide, etc.) doped therein.

For example, the diffusion film 141 can also be a laminated structure of a multilayer film. The light passing through the diffusion film 141 is scattered by the scattering particles therein, so that the observer perceives that the light is a luminance distribution directly provided by the surface of the diffusion film 141.

For example, as shown in FIG. 4, the light adjustment structure 140 further comprises a prism film 142 provided on a side of the diffusion film 141 far away from the color filter layer 120.

For example, the prism film 142 can be formed by laminating a prism layer having a sharp-angled micro-prism structure and a substrate layer, and is configured to concentrate a large angle of light toward a small angle to increase the viewing brightness of the positive viewing angle.

The embodiment is not limited to this. For example, the backlight module can also be an edge-lit type. In this case, the light adjustment structure comprises a light guide plate configured to homogenize light incident into the light guide plate.

For example, as shown in FIG. 4, the backlight module according to the embodiment of the disclosure further comprises a reflection layer 150 provided on a side of the light source 1130 far away from the color filter layer 120 to improve utilization of light energy.

Generally, a color filter substrate of a liquid crystal display apparatus is also provided with a color filter. However, because the arrangement of the color filters on the color filter substrate and the arrangement of the pixels on the array substrate are consistent, it is difficult to make adjustments (for example, adjustment on an area). When the color gamut of the display apparatus is low, the fluorescent powder in the light source of the backlight module can be replaced, but the process is complicated and costly. Therefore, according to the embodiment of the disclosure, the color filter is provided in the backlight module, which can not only reduce the cost required for the backlight module and simplify the process, but also quickly solve the problem of insufficient color gamut of the display apparatus.

Figure 5:
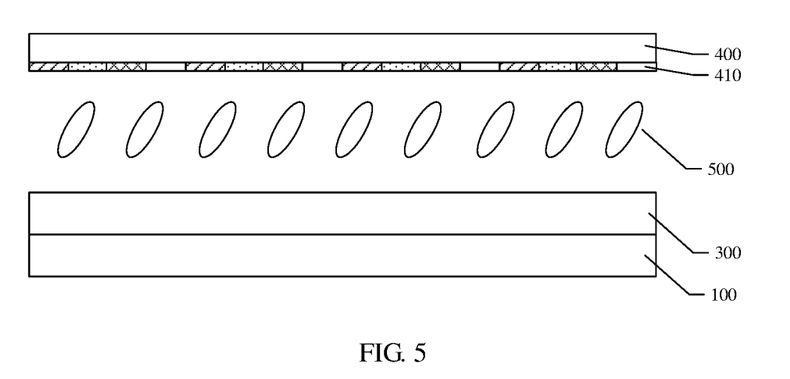
FIG. 5 is a partial structural schematic diagram of a liquid crystal display apparatus according to an embodiment of the disclosure.

FIG. 5 is a partial structural schematic diagram of a liquid crystal display apparatus according to an embodiment of the disclosure. As shown in FIG. 5, the liquid crystal display apparatus according to the embodiment comprises an array substrate 300 and a color filter substrate 400 arranged oppositely, a liquid crystal layer 500 provided between the substrate 300 and the color filter substrate 400, and the backlight module 100 as described in any of the above embodiments on the side of the array substrate 300 far away from the liquid crystal layer 500.

For example, as shown in FIG. 5, the color film substrate 400 according to the embodiment further comprises a color film layer 410. For example, the color film layer 410 comprises a red color film layer, a green color film layer, a blue color film layer, and a white color film layer. The embodiment comprises but is not limited to this.

The color filter layer comprised in the backlight module of the embodiment can filter and adjust the wavelength of the light emitted by the light source to better match the color film layer, thereby improving the color gamut of the liquid crystal display apparatus.

For example, the liquid crystal display apparatus can be any product or component having a display function such as a television, a digital camera, a mobile phone, a watch, a tablet, a laptop computer, a navigator, or the like comprising the liquid crystal display apparatus, and the embodiment is not limited to this.

The following statements should be noted:

(1) Unless otherwise defined, the same reference sign represents the same meaning in the embodiments of the disclosure and accompanying drawings (2) The accompanying drawings involve only the structure(s) in connection with the embodiment(s) of the disclosure, and other structure(s) can be referred to common design(s).

(3) For the purpose of clarity only, in accompanying drawings for illustrating the embodiment(s) of the disclosure, the size of a layer or a structure can be enlarged. However, it should understood that, in the case in which a component or element such as a layer, film, area, substrate or the like is referred to be "on" or "under" another component or element, it can be directly on or under the another component or element or a component or element is interposed therebetween.

What are described above is the embodiments of the disclosure only and not limitative to the scope of the disclosure; any of those skilled in related arts can easily conceive variations and substitutions in the technical scopes disclosed by the disclosure, which should be encompassed in protection scopes of the disclosure. Therefore, the scopes of the disclosure should be defined in the appended claims.

The invention claimed is:

1. A light emitting apparatus, comprising:
a light source and a color filter layer on a light exiting side of the light source, the color filter layer comprising color filters of at least two colors arranged in an array,
wherein the color filter layer is configured to have different transmittances to light of the at least two colors in white light emitted by the light source,
wherein the light source emits first white light, the first white light is converted to second white light after passing through the color filter layer, and the first white light comprises first color light and second color light, a relative spectral intensity of the first color light in the first white light is smaller than a relative spectral intensity of the second color light in the first white light, the color filter layer is configured to have a transmittance to the first color light larger than that to the second color light, so that a relative spectral intensity of the first color light in the second white light is larger than a relative spectral intensity of the second color light in the second white light.

2. The light emitting apparatus according to claim 1, wherein the light source comprises yttrium aluminum garnet (YAG) fluorescent powder.

3. The light emitting apparatus according to claim 1, wherein the color filters of the at least two colors have different volumes, so that the color filter layer has different transmittances to the light of the at least two colors.

4. The light emitting apparatus according to claim 3, wherein the color filters of the at least two colors have different areas to adjust the transmittances of the color filter layer to the light of the at least two colors.

5. The light emitting apparatus according to claim 3, wherein the color filters of the at least two color filters have different thicknesses to adjust the transmittances of the color filter layer to the light of the at least two colors.

6. The light emitting apparatus according to claim 1, wherein the first color light is red light and the second color light is green light or blue light.

7. The light emitting apparatus according to claim 1, wherein the color filter layer comprises a red color filter, a green color filter, and a blue color filter.

8. The light emitting apparatus according to claim 7, wherein the color filter layer further comprises a transparent film layer or an opening.

9. The light emitting apparatus according to claim 1, wherein the color filter of each color comprises a plurality of color filters each having the same shape and size.

10. The light emitting apparatus according to claim 9, wherein the plurality of the color filters of each color are evenly distributed.

11. A backlight module comprising:
the light emitting apparatus of claim 1;
a light adjustment structure on a light exiting side of the light emitting apparatus to achieve uniform light extraction.

12. A liquid crystal display apparatus comprising an array substrate and a color filter substrate disposed oppositely, a liquid crystal layer between the array substrate and the color filter substrate, and the backlight module according to claim 11 on a side of the array substrate far away from the liquid crystal layer.

13. A method of adjusting a light emission spectrum of the light emitting apparatus according to claim 1, comprising:
acquiring an original spectrum of light emitted by the light source;
acquiring a reference spectrum;
comparing the original spectrum with the reference spectrum to obtain a comparison result;
adjusting the color filter layer according to the comparison result so that the original spectrum of the light source is converted to a target spectrum after the light emitted by the light source passes through the color filter layer, and the target spectrum is substantially the same as the reference spectrum.

14. The method according to claim 13, wherein adjusting the color filter layer comprises adjusting volumes of the color filters of the at least two colors.

15. The method according to claim 14, wherein adjusting the volumes of the color filters of the at least two colors comprised in the color filter layer comprises: adjusting areas of the color filters of the at least two colors.

16. The method according to claim 14, wherein adjusting the volumes of the color filters of the at least two colors comprised in the color filter layer comprises: adjusting thicknesses of the color filters of the at least two colors.

17. The light emitting apparatus according to claim 1, wherein the first color light has a wavelength larger than that of the second color light.

* * * * *

UNITED STATES PATENT AND TRADEMARK OFFICE
CERTIFICATE OF CORRECTION

PATENT NO. : 11,391,989 B2  
APPLICATION NO. : 16/329899  
DATED : July 19, 2022  
INVENTOR(S) : Donglong Lin et al.

Page 1 of 1

It is certified that error appears in the above-identified patent and that said Letters Patent is hereby corrected as shown below:

On the Title Page (71) Applicants should read: BEIJING BOE OPTOELECTRONICS TECHNOLOGY CO., LTD., Beijing (CN); BOE TECHNOLOGY GROUP CO., LTD., Beijing (CN)

Signed and Sealed this  
Seventh Day of March, 2023

Katherine Kelly Vidal  
*Director of the United States Patent and Trademark Office*